United States Patent [19]

Dolle

[11] 4,251,372

[45] Feb. 17, 1981

[54] MAGNETIC FILTER WITH PERMANENT MAGNETS

[75] Inventor: Lucien Dolle, Palaiseau, France

[73] Assignee: Commissariat a l'Energie Atomique, Paris, France

[21] Appl. No.: 920,054

[22] Filed: Jun. 28, 1978

[30] Foreign Application Priority Data

Jul. 8, 1977 [FR] France ............................ 77 21084

[51] Int. Cl.[2] ............................ B01D 35/06

[52] U.S. Cl. ............................ 210/222

[58] Field of Search ............... 210/222, 223; 209/223, 209/232, 154

[56] References Cited

U.S. PATENT DOCUMENTS

| | | | |
|---|---|---|---|
| 2,792,115 | 5/1957 | Medearis | 210/154 |
| 2,915,186 | 12/1959 | Johannson | 210/223 |
| 3,581,898 | 6/1971 | Tyrell | 210/222 |
| 3,841,486 | 10/1974 | Heitmann | 210/222 |
| 4,043,864 | 8/1977 | Heitmann | 210/222 |

FOREIGN PATENT DOCUMENTS

| | | | |
|---|---|---|---|
| 904041 | 12/1953 | Fed. Rep. of Germany | 210/222 |
| 487693 | 4/1952 | Italy | 210/223 |
| 111582 | 8/1944 | Sweden | 209/232 |
| 150101 | 9/1920 | United Kingdom | 210/222 |

*Primary Examiner*—Theodore A. Granger
*Attorney, Agent, or Firm*—Schwartz, Jeffery, Schwaab, Mack, Blumenthal & Koch

[57] ABSTRACT

Magnetic filter of the type comprising a plurality of permanent magnets disposed in a pipe traversed by a fluid to be filtered, wherein it comprises a system of parallel plates disposed in the pipe parallel to the fluid outflow direction, each plate supporting a plurality of magnetized bars or cylindrical members disposed perpendicular to the plate and all having a same pole on the same side of their supporting plate.

Particular applications of the present filter are to the vessel and steam generator of a high power pressurized water nuclear reactor.

5 Claims, 8 Drawing Figures

MAGNETIC FILTER WITH PERMANENT MAGNETS

BACKGROUND OF THE INVENTION

The present invention relates to a magnetic filter with permanent magnets. A particular application thereof is to filtering corrosive products in the primary circuit of nuclear reactors.

It is known that the water which circulates in the primary circuit of a nuclear reactor generally contains ferromagnetic impurities. These impurities generally comprise magnetite and ferrites, products which are relatively insoluble in water and which are therefore transported through the circuit in the form of fine suspended particles.

The ferromagnetic nature of these particles is utilized to eliminate them from the circuit, for which purpose so-called magnetic filters are used. These filters essentially comprise a casing made from non-magnetic material, filled either with a magnetizable lining or with permanent magnets. The magnetizable lining is generally constituted by a bed of balls placed within a winding. The permanent magnets may either comprise magnetic pieces associated with steel grids or a system of multipolar magnetic bars kept spaced by non-magnetic spacers.

These filters function in the following manner. When a fluid containing ferromagnetic impurities passes through the volume containing the magnetized pieces (balls or magnets), the impurities are transported from areas with a weak magnetic field into areas with a strong magnetic field, i.e. towards the magnetic poles of said pieces and become attached thereto.

The filter of the present invention belongs to the second category, i.e. that in which the magnetized pieces are permanent magnets. Interest in this type of construction has been renewed in view of the fact that the materials developed for forming the magnets now make it possible to obtain large fields even under very difficult conditions and specifically at temperatures of about 300° C., such as occur in the primary circuit of a nuclear reactor. Thus, it is now possible to produce permanent magnets which even at this high temperature produce a magnetic field, whose intensity reaches that which was previously obtained with traditional materials, but only at ambient temperature. These advances in connection with magnetized materials increase the efficiency of filters with permanent magnets for various reasons. The fluidity of the water, which is the opposite to its dynamic viscosity, is much higher at 300° C. than at 20° C. (by a factor of approximately 12), whilst the variation in the density of the water and its suspended particles is, with respect to this factor, respectively low and minute. However, the displacement speed of a particle in a flow of water under the action of magnetic forces is precisely proportional to the fluidity of the water, so that the movement of the particles towards the poles is facilitated and the collection of impurities is improved.

Magnetic filters incorporating permanent magnets are already known and reference can be made in this connection to the article by SPILLNER, published in the Journal BRENNSTOFF WARMEKRAFT, 1969, 8, pp. 401-409. Such filters comprise multipolar bars radially fixed around a shaft disposed on the axis of a cylindrical casing. Each bar comprises an end to end assembly of small magnets, whose poles face one another. These magnets are kept spaced by non-magnetic inserts.

Due to this arrangement, the retention capacity of the different magnets is not used to the full, because the magnets tend to act more via their side wall rather than their pole faces. Furthermore, in such an arrangement, the zone towhich the ferromagnetic particles are attached rapidly assumes large dimensions, even in the case of a limited weight of the retained material, which increases the distance of the active areas from the poles and rapidly reduces the action of the magnetic forces on either the still suspended particles or on the already retained particles. The latter are in particular then more easily torn away, if there is a variation in the flow rate in the filter and are then resuspended in the water.

BRIEF SUMMARY OF THE INVENTION

The present invention relates to a filter having permanent magnets which obviates these disadvantages. To this end, the magnets are arranged in such a way that the retention areas especially comprise the pole faces of the magnets and not the lateral surfaces. It has in fact been observed by the Applicant that certain particles, e.g. magnetite have readily become fixed round the poles, but very unreadily on the side wall of the magnetized bars.

Another feature of the invention is that the arrangement of the magnets is such that the filter offers the fluid a maximum retention surface, which is much greater than that of the prior art filters used in permanent magnets. Thus, the various magnets do not mask one another. The optimum arrangement can be investigated partly on a theoretical basis by the calculation and study of the trajectories of the magnetic particles in a flow of water in the vicinity of the magnetic masses. These trajectories are dependent on a parameter c/v, in which c is the trapping rate and v the entrainment speed by the liquid filament.

A final feature of the filter according to the invention is to provide a modular structure which makes it very easy to construct and maintain.

All these features are obtained by the use of a system of parallel plates disposed in a pipe parallel to the fluid outflow direction, each plate supporting a plurality of magnetized cylindrical members or bars which are perpendicular thereto and which all have the same pole on the same side of their supporting plate.

The greatest efficiency of the filter is obtained when the poles of the magnetized bars supported by the same plate are arranged in such a way that neighboring plates are staggered relative to one another in the direction parallel to the outflow and in the direction perpendicular to the outflow and parallel to the plane of the plate.

Preferably, two adjacent plates are arranged relative to one another in such a way that for one of the two plates each magnetized bar is arranged downstream relative to the fluid outflow direction of the closest magnetized bar supported by the other plate. This arrangement is more effective if the downstream bar is located in the vortex region created by the upstream bar.

The invention also provides two constructional embodiments for the supporting plates, one using glove fingers in which are enclosed the magnetized bar and the other using magnetized cylindrical members fixed in the openings.

BRIEF DESCRIPTION OF THE DRAWINGS

The invention is described in greater detail hereinafter relative to non-limitative embodiments and with reference to the attached drawings, in which.

DETAILED DESCRIPTION OF THE PREFERRED EMBODIMENTS

The modular nature of the filter according to the invention was stressed hereinbefore. This means that is comprises a system of plates, each supporting a plurality of magnetized bars distributed in accordance with a special distribution law which is the same for all the plates. For the description of the distribution of the system of magnetized poles in the filter, the distribution having a certain complexity because it effects the position of the poles in a three dimensional space, it is convenient to depend on its modular character and firstly describe the distribution of the magnetized bars within the same module and then define the special manner in which the modules are associated, which finally determines the overall distribution of the bars in the filter.

Figure 1:
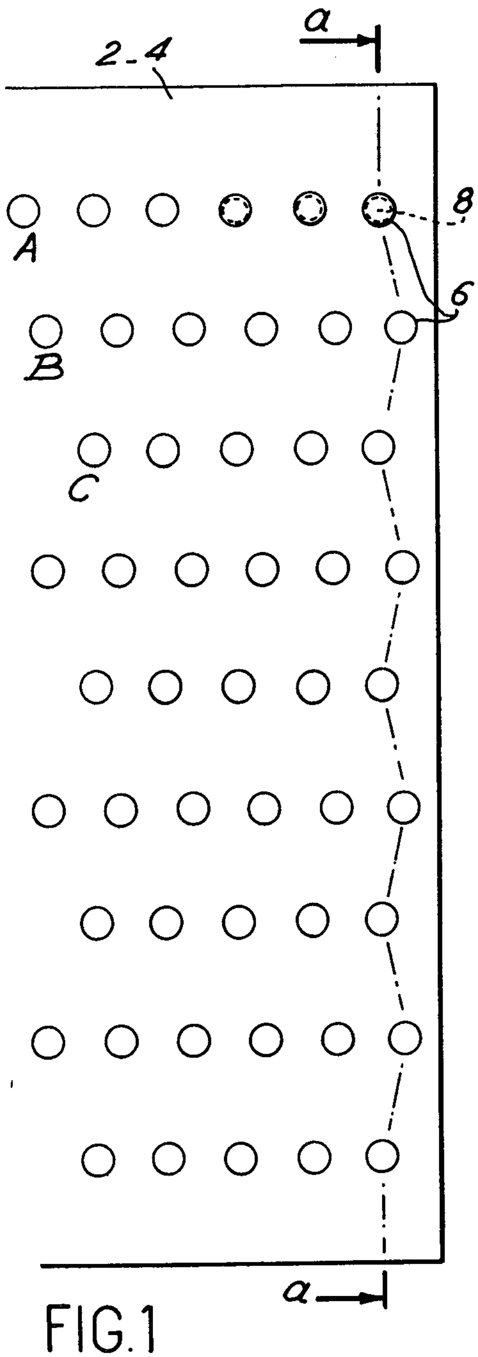
FIG. 1 shows a front view of a supporting plate for the magnetized bars using glove fingers.
Figure 2:
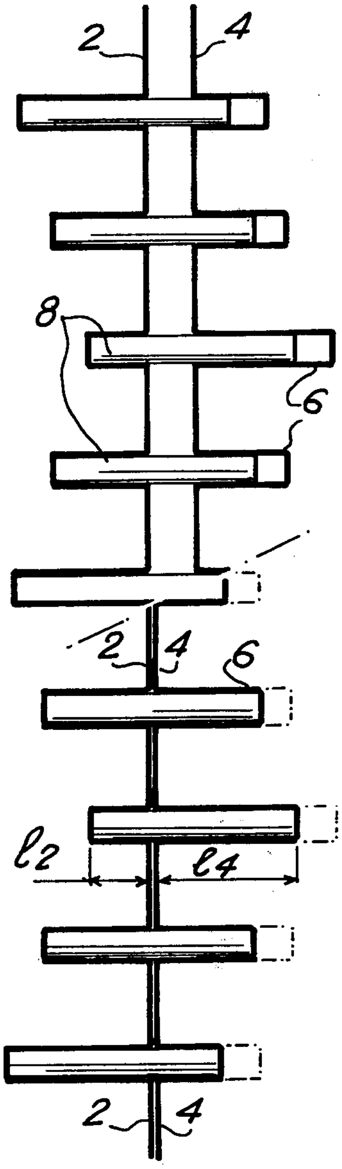
FIG. 2 shows a cross-sectional view of the supporting plate of FIG. 1, taken along a broken line passing through the bars.
Figure 3:
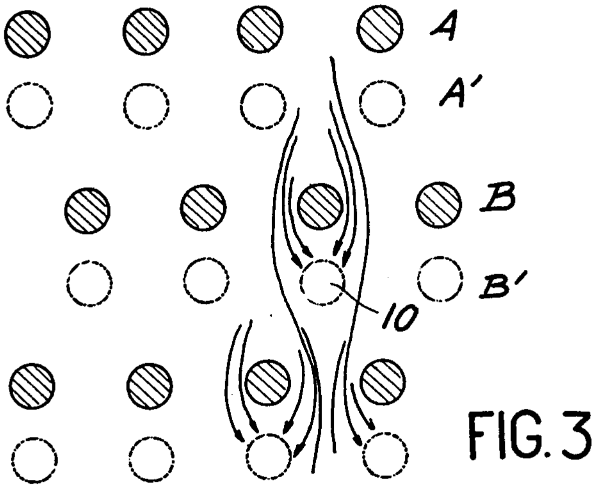
FIG. 3 shows a cross-sectional view taken parallel to the plates of FIG. 1 and illustrating the relative position of the bars belonging to two adjacent plates.
Figure 4:
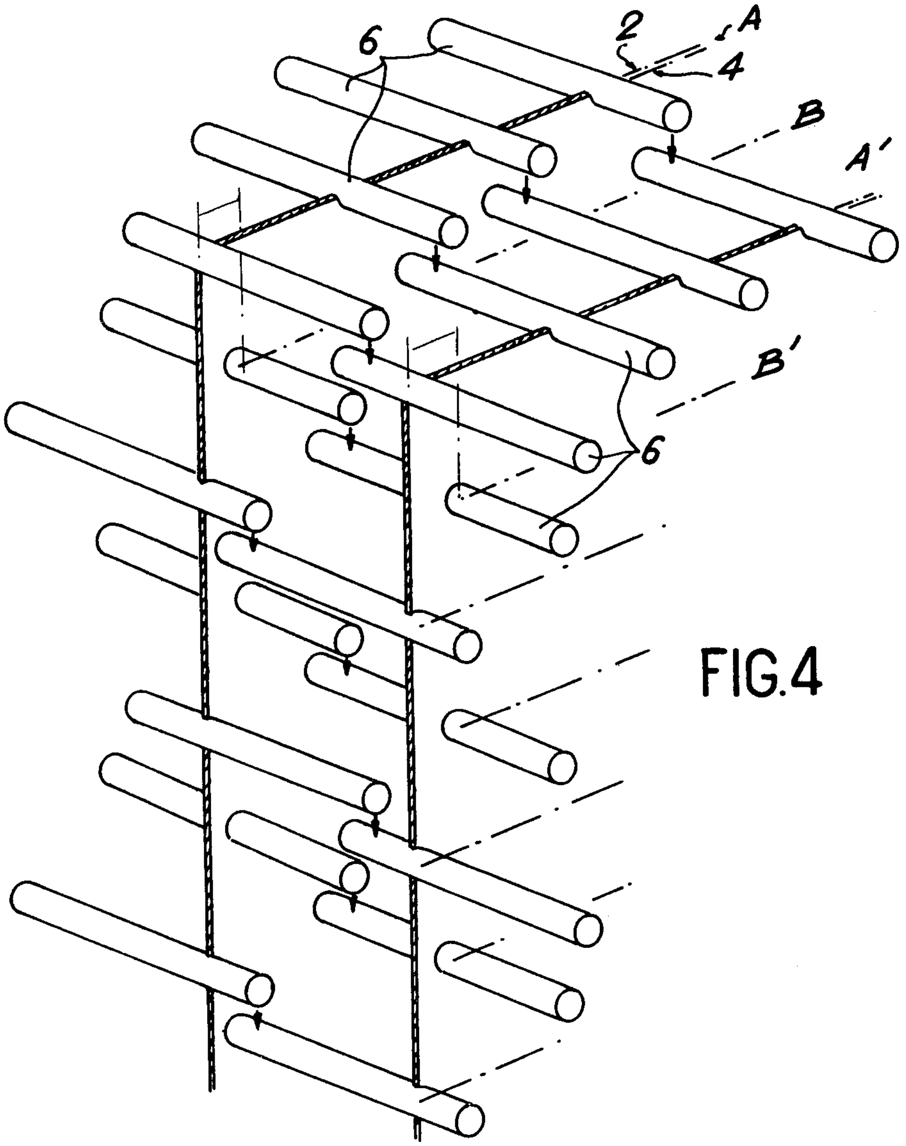
FIG. 4 show in perspective view two assembled adjacent plates.

The distribution of the magnets in one and the same module is illustrated by FIGS. 1 and 2, the association of the modules by FIG. 3 and the distribution in space by FIG. 4.

FIG. 1 shows a front view of a plate, while FIG. 2 which is associated therewith, shows a section through said plate taken along the broken line aa. The plate is formed by two planar walls 2 and 4 in which have been formed glove fingers 6, for example by stamping or pressing. The bases of the glove fingers are distributed over a plurality of lines A, B, C etc which are identical for the two walls. The bases occupying the same row in the different lines are staggered relative to one another in the fluid outflow direction. Therefore, line aa, which for example joins the bases of row 1, is a broken line. In practice, it is possible to adopt a distribution having a certain periodicity, like the staggered distribution of FIG. 1.

When the two walls 2 and 4 are applied to one another, the glove fingers of the two walls face one another in pairs, because the distribution is the same on both walls. Two facing fingers have complementary depths in a pairwise manner, which means that length $l_2$ of a finger belonging to plate 2 and length $l_4$ of the facing finger on plate 4 are such that $l_2+l_4$ is equal to a length L, which is the same for all the pairs of fingers. However, depth $l_2$ (or $l_4$) varies on passing from one finger to adjacent fingers. FIG. 2 shows the variation in said depths for fingers occupying the same row in different lines. This variation also exists for the fingers of one and the same line.

Thus, the volumes define by the pairs of fingers are all identical, although disposed in different ways relative to the supporting plate. Within said volumes are placed magnetized bars 8, whose poles are located on either side of the supporting plate. The fitting of the bars is effected in such a way that all the poles of the same nature are located on the same side of the plate.

It is obvious that this arrangement of the bars brings about the indicated distribution for the magnetic pole. The poles are neither aligned in the outflow direction, nor in the perpendicular direction, due to the fact that the volumes in which the magnets are inserted are not distributed in the same way relative to the secant plane constituted by the supporting plate. Thus, such a module offers the fluid to be filtered a maximum retention surface.

From the technological standpoint, the supporting plate is preferably made from a non-corrosive material, for example stainless steel. The glove fingers have an internal diameter which is just sufficient for the magnetized bars to slide within them with a minimum clearance. They are welded to their supporting wall. The assembly of two walls 2 and 4 can be brought about by welding along their perimeter.

Obviously, if it is desired to form a module which must be applied to the planar wall of the filter, the magnets will only be arranged on one side of the plate. Such a module will then be formed by one glove finger wall, such as wall 2 or wall 4, and a planar wall which will be applied to the first wall to seal said fingers. The depth of the latter must therefore be in this case equal to the length of the magnetized bars, which differs from one bar to the next.

In order to assemble two modules, the two groups of magnetized bars are fitted into one another in such a way that the poles are not in opposition in the finished assembly. As the plates are identical, their bringing together and fitting together cause no problems. The plates are rendered integral with a preferably constant spacing by using any appropriate means, for example spacers. The term opposition is understood to mean that the "south" face of one module is fitted into the "north" face of the other module. This arrangement prevents deformations of the filter under the action of repulsive magnetic forces and the risk of seeing the magnets gradually lose their effectiveness is reduced, as otherwise this loss of effectiveness would be prejudicial to the service life of the filter.

Although it is possible to stagger the various magnetized bars of two adjacent plates, preference is given to the arrangement illustrated in FIG. 3.

When viewed end-wise, the bars of the same plate are distributed along lines A, B and C for one plate and A', B', C', etc for the other plate, said lines being perpendicular to the outflow direction. The bars of lines A', B', C' are preferably disposed downstream of the bars of lines A, B, C for the following reasons. As the bars necessarily have non-zero dimensions, they disturb the outflow of the fluid, so that vortex or semi-vortex regions form downstream of each bar. Particles having still not been fixed to a bar may be swept along by these vortex movements in which they are to some extent trapped or at least are momentarily slowed down. It is therefore advantageous to arrange the poles of one plate in the vortex regions created by the bars of the adjacent plate, so that these poles effectively collect the particles.

In this variant, the magnetized bars of the filter assembly are therefore in the form of pairs, the bars of one pair being aligned in the outflow direction of the fluid, but this does not necessarily apply to their poles.

FIG. 4 finally shows in perspective the distribution of the magnetized bars in the gap separating two adjacent modules. The notations are the same as in FIGS. 1 to 3 .

Figure 5:
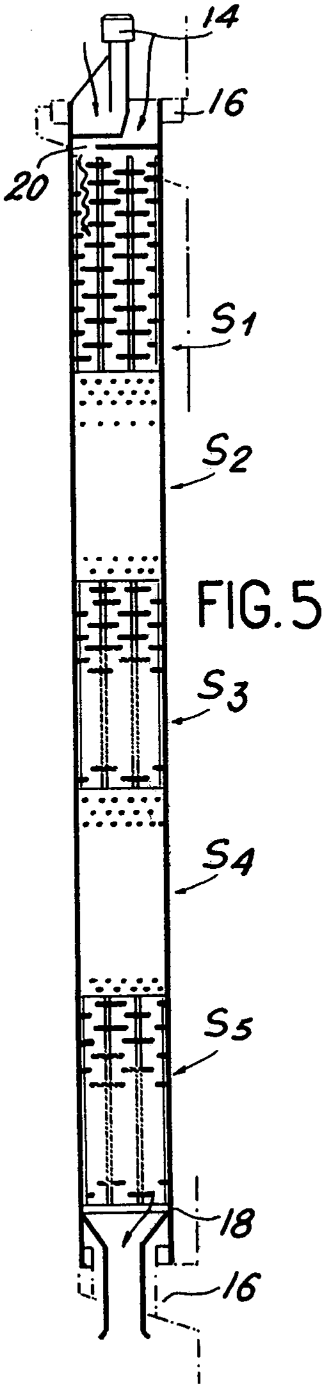
FIG. 5 show a filter having several sections with different orientations.

FIG. 5 shows in longitudinal section and in simplified manner a filter such as that described hereinbefore and which comprises five sections $S_1$, $S_2$, $S_3$, $S_4$ and $S_5$ of identical construction, but in which the orientation of the magnetized bars is rotated by 90° on passing from one section to the next. This filter also comprises a gripping device 14, positioning and fixing devices 16 for the filter, a grid 18 arranged at the downstream end (said grid serving to hold back any fragments from the non-magnetic lines in the case of deterioration) and finally at the filter intake a fixed or variable charge limiting means 20, which makes it possible to limit the fluid flow rate to the optimum value, which is that offering the best retention conditions for the magnetic impurities during the progressive saturation of the capacity of the filter. This device is useful in as far as the loss of charge of the filter is negligible and does not vary significantly whilst the retention force of the impurities on the poles decreases during recharging of the latter.

Obviously, the filter can function either in the vertical position, with the fluid circulating from top to bottom or bottom to top, or in the horizontal position, the grid 18 and the charge limiting means 20 being arranged accordingly.

A special embodiment will now be described, this corresponding to a very small filter which is able to operate in the primary circuit of a high power pressurized water reactor.

The cross-section of this filter is a 90 mm square and the height of the filtering assembly is 1 m. It comprises five 200 mm high modular assemblies. The deviants are bars of 4 mm diameter and 35 mm for the central modules and 15 and 20 mm for the end plates, the spacing between two bars in the same line being 12 mm and the spacing between lines being 20 mm. The usable capacity of such an assembly is approximately 6 grammes of magnetite per kilogramme of magnetized bars. The latter are preferably chosen in an alloy or magnetic frittered oxide quality with high performance and a high Curie temperature, for example using TICONALL. The effectiveness of this filter is about 70 to 80%, and at ambient temperature and with a specific flow rate of 5 $m^3 . h^{-1} . dm^{-2}$, the best linear velocities are about 10 to 20 $cm.s^{-1}$. The filter starts to release the magnetite at the specific flow rate of 10 to 15 $m^3 . h^{-1} . dm^{-2}$, corresponding to linear velocities of approximately 40 $cm.s^{-1}$. The efficiency of the filter exceeds 90%. On cooling the filter, precautions must be taken to ensure that the corrosive products held back by it are not entrained into the circuit, due to the great variation in the dynamic viscosity of the water during the temperature reduction, if the flow rate in the filter is close to the permitted limit.

The filter can be regenerated according to known methods. In general, these methods consist of entraining the mud or sludge in a washing water flow. However, if the filter is placed in the vessel of a high power nuclear reactor in the manner to be described hereinafter, it is charged with corrosive products in the form of radio active sludge, but due to the neutron radioactive, the materials of which the filter is made are also made radioactive. It is therefore preferable to extract the used filter from the reactor and dispose of it with the solid radio active waste and without further treatment, then replacing it with a new filter.

When the filter is fitted under conditions such that its constituent materials are not made radioactive, two methods are possible, i.e., in situ regeneration, or replacement. The choice depends on the respective costs of treating the radioactive effluents of regeneration or of replacing the filter. Regeneration can be carried out by entraining the sludge by means of a washing water current if the water flow through the system of magnets has an alternating movement which has a sufficiently high linear velocity to correspond to the critical detachment linear velocity at the poles of the magnets, this velocity being on the order of 40 $cm.s^{-1}$.

Obviously, if the filter is charged exclusively with non radioactive sludge, its installation can always be such that the agitation of the filter in a section which can be isolated from the liquid filament of the circuit may be performed automatically by means of a suitable agitating or stirring device. Connected pipes, equipped with valves, are then provided so as to facilitate the washing of the filter and the extraction of the sludge.

The previous description and the relevant FIGS. 1 to 5 deal with modules comprising magnets in the form of elongated bars located in a protective casing. This constructional variant is preferred when the filter is used in the primary circuit of a nuclear reactor because in this application it is advisable to protect the bars against corrosion and fix them to a support without their having to undergo severe mechanical stresses or thermal shocks.

Figure 6:
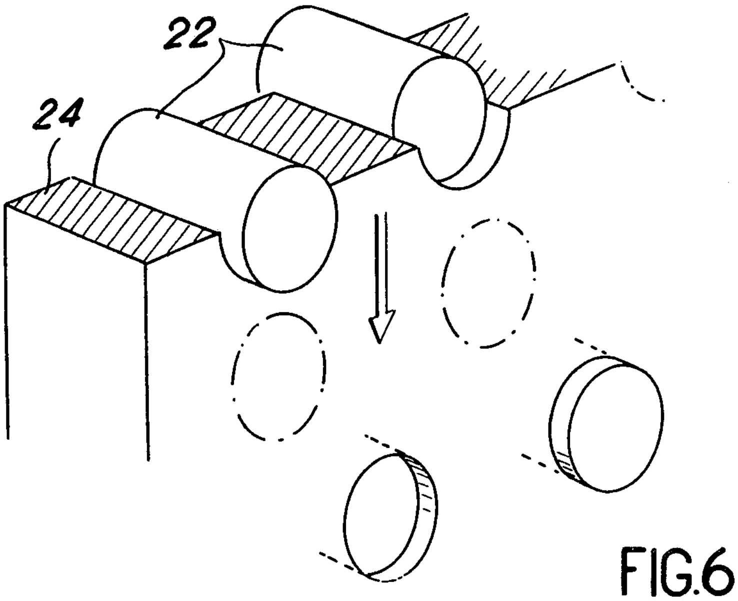
FIG. 6 show a plate fitted with magnetized cylindrical members.

However, the invention also provides simpler embodiments, such as that illustrated in FIG. 6, where the magnets comprise cylindrical members 22 located in the appropriate number of openings in a plate. As in the previous embodiment, the openings can be distributed in staggered lines, whereby the members occupy positions varying from one opening to the next. Thus, for example, the openings can be staggered and the magnets can be arranged in such a way that one magnet is flush with one of the walls, whilst its neighbor is flush with the other wall.

Hereinafter, two examples of using the filter according to the invention in the primary circuit of a pressurized water nuclear reactor will be described.

Figure 7:
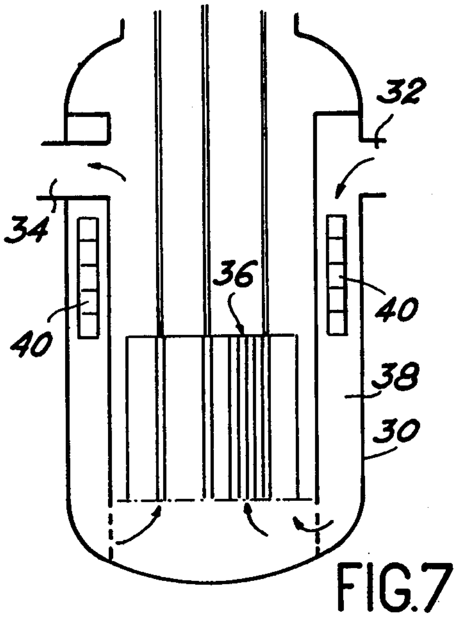
FIG. 7 show the use of the filter of the invention in the vessel of a high power pressurized water nuclear reactor.

In the first example, the position occupied by the filter is that illustrated in FIG. 7. By means of tube 32, vessel 30 of a nuclear reactor receives cooling water, which leaves the vessel by tube 34 in the direction of a (not shown) steam generator. The water passes from bottom to top through core 36, after having been directed into the base by a ring-shaped channel 38.

Filters 40 according to the invention are placed directly in channel 38, level with the smallest neutron radiation flow. The charge limiting means of the filter is fixed and adjusted to the construction in such a way that it limits the water flow to the correct value in the system of magnetized bars. The suitable usable capacity is obtained by selecting an adequate number of filters. The total capacity of the filters must naturally be chosen as a function of the possible frequency of the replacements, because this example relates to the case where the filters are neither regenerated nor reused, but are instead replaced on changing the fuel.

Figure 8:
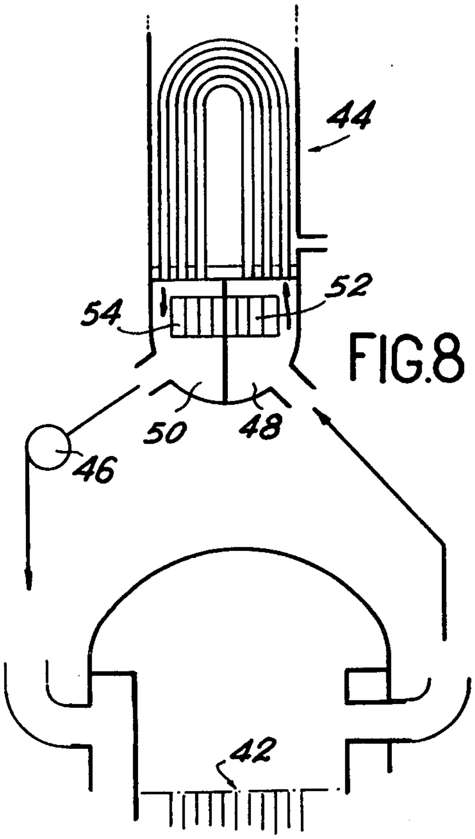
FIG. 8 show the use of the filter of the invention in the steam generator of a high power pressurized water nuclear reactor.

In a second performance example, the position occupied by the filter according to the invention is that illustrated in FIG. 8. FIG. 8 shows a nuclear reactor 42 and, following the pressurized hot water circulation direction, a steam generator 44 and a main circulating pump 46, which delivers the water to the reactor core. Steam generator 44 has in its lower part two separate compartments 48 and 50, called water boxes, which, level with the main tubes, separate the hot and cold branches of the steam generator. Each of the water boxes has a (not shown) manhole, permitting the introduction of inspection and repair equipment.

According to the invention, the filters are placed in the water boxes. The filters are 52 and 54. The water flow rate in the steam generator may exceed 20,000 $m^3.h^{-1}$ and the linear velocity of the water in the water box is approximately 1.6 $m. s^{-1}$. With a specific flow rate of 5 $m^3.h^{-1}$ in a filter, about 5% of the normal flow rate of a steam generator can be filtered with a total cross-section of 2 $m^2$ on magnetic assemblies.

For reasons of overall dimensions and to facilitate the fitting and extraction of the filters through the manhole, it is preferable to distribute the system of filters over the two water boxes at a rate of 1 $m^2$ of assembly cross-section in each. Thus, in water box 48 of the hot branch of the generator, filter assembly 52 with a passage cross-section of 1 $m^2$ functions with water circulating from bottom to top, whilst in cold branch 50 the other filter assembly 54 with a 1 $m^2$ passage cross-section functions with water circulating from top to bottom.

The water flow rate in the magnetic assemblies is regulated by a fixed charge limiting means, as has been described hereinbefore. The extraction and new fitting of the filters, which only takes place in the case of a cold stop of the reactor, can be performed through the manhole of the steam generator. In this embodiment it is useless to envisage an in-circuit regeneration mode, because the presence of such a large assembly volume would be prejudicial to the performance of the work which has to be carried out periodically in the water boxes of steam generators.

Obviously, the two examples of use of the filter according to the invention in the vessel of a high power pressurized water reactor and in the primary circuit steam generator of such a reactor have only been given for illustrative purposes and other applications can be envisaged, for example in a recirculation circuit or in the condensate circuit of boiling water reactors or in the secondary circuit of a pressurized water reactor, or even in non-nuclear installations.

What is claimed is:

1. A magnetic filter of the type having a plurality of permanent magnets disposed in a pipe traversed by a fluid to be filtered, said filter having at least one filtering section comprising a system of coparallel plates disposed in said pipe parallel to the fluid outflow direction, each said plate supporting a plurality of magnetized bars, each said bar magnetized along its respective longitudinal axis and disposed perpendicular to said plates, and all said bars supported by a common said plate having like magnetic poles on the same side of said common plate, the poles of the magnetized bars supported by the same plate being disposed such that adjacent bars are staggered relative to one another in the direction parallel to the outflow and in the direction perpendicular to the outflow and parallel to the plane of the plate, the points at which the magnetized bars are fixed to a common plate being distributed over a plurality of lines lying in the plane of said plate and parallel to the fluid outflow direction, adjacent said lines being staggered relative to one another, the distribution of the magnetized bars on each supporting plate having a double spatial periodicity, a first periodicity in the outflow direction, and a second periodicity in the direction perpendicular to the outflow, and two adjacent said plates being so arranged relative to one another that each magnetized bar supported by one of the two plates is disposed downstream, in the fluid outflow direction, of the closest magnetized bar supported by the other of the two plates.

2. A filter according to claim 1, wherein for each pair of magnetized bars aligned in the fluid outflow direction, the downstream bar is located in the vortex region created by the upstream bar in the fluid.

3. A filter according to claim 1, wherein each said plate comprises two joined walls, each wall provided with a plurality of glove fingers which face glove fingers of the other wall in pairs when the two walls are joined and which have complementary depths, said fingers thus defining in pairs a plurality of identical volumes in which are disposed a plurality of identical said magnetized bars.

4. A filter according to claim 1, wherein each plate comprises a wall containing openings, whereby magnetized cylindrical members are located in said openings and are fixed to the wall.

5. A filter according to claim 1, comprising a series of said filtering sections, the planes of said plates of adjacent said sections lying at 90° to one another, whereby the polar orientation of said magnetized bars varies from one said section to the next.

* * * * *